(12) United States Patent
Dagan

(10) Patent No.: US 10,076,795 B2
(45) Date of Patent: Sep. 18, 2018

(54) TRIANGULAR TANGENTIAL MILLING INSERT AND MILLING TOOL

(71) Applicant: Iscar, Ltd., Tefen (IL)

(72) Inventor: Daniel Dagan, Naharia (IL)

(73) Assignee: Iscar, Ltd., Tefen (IL)

( * ) Notice: Subject to any disclaimer, the term of this patent is extended or adjusted under 35 U.S.C. 154(b) by 254 days.

(21) Appl. No.: 14/945,486

(22) Filed: Nov. 19, 2015

(65) Prior Publication Data

US 2017/0144235 A1    May 25, 2017

(51) Int. Cl.
| | |
|---|---|
| *B23B 27/16* | (2006.01) |
| *B23C 5/20* | (2006.01) |
| *B23C 5/22* | (2006.01) |
| *B23C 5/06* | (2006.01) |
| *B23C 5/02* | (2006.01) |

(52) U.S. Cl.
CPC .............. *B23C 5/2221* (2013.01); *B23C 5/02* (2013.01); *B23C 5/06* (2013.01); *B23C 2200/0477* (2013.01); *B23C 2200/361* (2013.01); *B23C 2200/367* (2013.01)

(58) Field of Classification Search
CPC ...... B23C 2200/0477; B23C 2200/367; B23C 5/2221; B23C 2200/361; B23C 5/02; B23C 5/06; B23C 2210/0042; B23C 2220/28

See application file for complete search history.

(56) References Cited

U.S. PATENT DOCUMENTS

| | | | | |
|---|---|---|---|---|
| 3,490,117 | A | * | 1/1970 | Karl ..................... B23B 27/1614 407/101 |
| 3,574,911 | A | * | 4/1971 | Penoyar .................. B23C 5/207 407/114 |

(Continued)

FOREIGN PATENT DOCUMENTS

| | | |
|---|---|---|
| CN | 103212726 A | 7/2013 |
| DE | 102005058731 | 6/2007 |

(Continued)

OTHER PUBLICATIONS

International Search Report dated Feb. 13, 2017, issued in PCT counterpart application (No. PCT/IL2016/051170).

(Continued)

*Primary Examiner* — Sara Addisu
(74) *Attorney, Agent, or Firm* — Womble Bond Dickinson (US) LLP

(57) ABSTRACT

A reversible and indexable tangential milling insert includes two major surfaces and a peripheral surface which extends therebetween. The milling insert includes a mid-plane (M) located midway between the major surfaces, and an insert clamping bore with a central bore axis (H). The peripheral surface includes three side surfaces, each of which includes exactly two cutting portions, two relief portions and two minor abutment surfaces located on opposite sides of the mid-plane (M), each continuously extends between respective cutting portion and relief portion. Each cutting portion includes a major cutting edge, a minor cutting edge, and a corner cutting edge. In a cross section along a first imaginary plane perpendicular to the bore axis (H), each minor abutment surface is concavely curved, and on each side surface, the minor abutment surfaces converge outwardly.

23 Claims, 5 Drawing Sheets

(56) References Cited

U.S. PATENT DOCUMENTS

| | | | | |
|---|---|---|---|---|
| 3,805,349 A * | 4/1974 | Nose | ................ | B23C 5/202 |
| | | | | 407/114 |
| 4,573,831 A * | 3/1986 | Lacey | ................ | B23C 5/2213 |
| | | | | 407/114 |
| 4,755,085 A | 7/1988 | Murén et al. | | |
| 5,314,269 A * | 5/1994 | Arai | ................ | B23C 5/2221 |
| | | | | 407/113 |
| 5,876,160 A * | 3/1999 | Johnson | ................ | B23C 5/202 |
| | | | | 407/113 |
| 7,150,215 B2 * | 12/2006 | Krehel | ................ | B23D 61/06 |
| | | | | 83/835 |
| 7,390,149 B2 * | 6/2008 | Wihlborg | ................ | B23C 5/06 |
| | | | | 407/102 |
| 7,494,303 B2 | 2/2009 | Koskinen | | |
| 7,976,250 B2 * | 7/2011 | Fang | ................ | B23C 5/109 |
| | | | | 407/113 |
| 8,430,606 B2 | 4/2013 | Zettler | | |
| 8,678,718 B2 * | 3/2014 | Hecht | ................ | B23B 27/1614 |
| | | | | 407/104 |
| 9,296,054 B2 * | 3/2016 | Kovac | ................ | B23B 27/1611 |
| 2003/0180103 A1 * | 9/2003 | Nagaya | ................ | B23C 5/207 |
| | | | | 407/34 |
| 2005/0063792 A1 * | 3/2005 | Satran | ................ | B23C 5/1072 |
| | | | | 407/113 |
| 2008/0044241 A1 | 2/2008 | Koskinen | | |
| 2009/0136304 A1 * | 5/2009 | Satran | ................ | B23C 5/207 |
| | | | | 407/104 |
| 2009/0155004 A1 * | 6/2009 | Jansson | ................ | B23C 5/06 |
| | | | | 407/40 |
| 2009/0155005 A1 | 6/2009 | Jansson | | |
| 2011/0020080 A1 | 1/2011 | Zettler | | |
| 2012/0039678 A1 * | 2/2012 | Nguyen | ................ | B23C 5/109 |
| | | | | 407/113 |
| 2012/0070242 A1 * | 3/2012 | Choi | ................ | B23C 5/109 |
| | | | | 407/113 |
| 2012/0195700 A1 * | 8/2012 | Chen | ................ | B23C 5/06 |
| | | | | 407/40 |
| 2012/0308317 A1 * | 12/2012 | Choi | ................ | B23C 5/06 |
| | | | | 407/47 |
| 2013/0108387 A1 * | 5/2013 | Ishi | ................ | B23C 5/109 |
| | | | | 409/132 |
| 2013/0266392 A1 * | 10/2013 | Lee | ................ | B23C 3/06 |
| | | | | 409/234 |
| 2014/0010605 A1 * | 1/2014 | Smilovici | ................ | B23C 5/06 |
| | | | | 407/42 |
| 2014/0064864 A1 * | 3/2014 | Kaufmann | ................ | B23B 27/141 |
| | | | | 407/114 |
| 2014/0212228 A1 * | 7/2014 | Horiike | ................ | B23C 5/109 |
| | | | | 407/42 |
| 2014/0234036 A1 * | 8/2014 | Atar | ................ | B23C 5/109 |
| | | | | 407/40 |
| 2014/0348599 A1 | 11/2014 | Kovac et al. | | |
| 2015/0071717 A1 * | 3/2015 | Morrison | ................ | B23C 5/207 |
| | | | | 407/51 |

FOREIGN PATENT DOCUMENTS

| | | |
|---|---|---|
| FR | 2164302 | 7/1973 |
| FR | 2918909 | 1/2009 |

OTHER PUBLICATIONS

Written Opinion dated Feb. 13, 2017, issued in PCT counterpart application (No. PCT/IL2016/051170).

* cited by examiner

TRIANGULAR TANGENTIAL MILLING INSERT AND MILLING TOOL

FIELD OF THE INVENTION

The subject matter of the present application relates to milling tools having tangentially mounted milling inserts made of cemented carbide. Specifically, it relates to tangential milling inserts which include a clamping bore.

BACKGROUND OF THE INVENTION

A common process of producing a milling insert includes compaction of a carbide powder mixed with a binder, followed by sintering, which usually leads to a volume decrease of the compacted mix, or body. Compacted bodies which include a bore may include regions, or volumes, adjacent the bore, which are denser than others. One problem that can arise during sintering is that these denser regions are less prone to lose volume, compared to regions which are less dense. This can lead to undesirable, and/or unpredictable, distortion in outer surfaces which are adjacent to these dense regions. For example, in abutment surfaces of the insert (which are usually required to be accurate and homogenous) distortion (e.g., a bulge) can appear at the middle of the surface, which is usually nearest to the bore.

SUMMARY OF THE INVENTION

In accordance with a first aspect of the subject matter of the present application there is provided a reversible and indexable triangular tangential milling insert comprising two opposite triangular major surfaces and a peripheral surface extending therebetween, the milling insert further comprising a mid-plane (M) located midway between the major surfaces, and an insert clamping bore opening out directly to the major surfaces and having a central bore axis (H), the peripheral surface comprising exactly three identical elongated side surfaces, each side surface comprising exactly two cutting portions, two relief portions and two identical elongated minor abutment surfaces located on opposite sides of the mid-plane (M), each continuously extending between respective cutting portion and relief portion, each cutting portion comprising:

a major cutting edge defined at a meeting of the side surface with a major surface, a minor cutting edge defined at a meeting of the side surface with an adjacent side surface, and a corner cutting edge extending between the major and minor cutting edges, wherein, in a cross section along a first imaginary plane (P1) which is perpendicular to the bore axis (H), each minor abutment surface is concavely curved; and on each side surface, the minor abutment surfaces converge outwardly, away from the insert clamping bore.

In accordance with a second aspect of the subject matter of the present application there is further provided a reversible and indexable tangential milling insert comprising two opposite triangular major surfaces and a peripheral surface extending therebetween, the milling insert further comprising a mid-plane (M) located midway between the major surfaces, and an insert clamping bore opening out directly to the major surfaces and having a central bore axis (H), the peripheral surface comprising exactly three identical elongated side surfaces, each side surface comprising exactly two diagonally opposite cutting portions and two elongated minor abutment surfaces located on opposite sides of the mid-plane (M), wherein, each minor abutment surface is cylindrical and has a first radius (R1); and wherein in in a plan view of each major surface a circle (C1) is inscribed between the cutting edges and has a second radius (R2); and the milling insert has a curvature ratio C=(R1/R2) which is larger than 7.

Any of the following features, either alone or in combination, may be applicable to any of the above aspects of the subject matter of the application:

In each side surface, all cutting edges are raised in their entirety above the minor abutment surfaces.

Each relief portion comprises an intermediate relief surface, a corner relief surface and a minor relief surface which extends therebetween.

Every two adjacent minor abutment surfaces meet at a non-planar continuous longitudinal ridge which extends along the mid-plane (M).

In each side surface, all the cutting edges are raised above the ridge, away from the insert clamping bore.

The ridge is outwardly convex in a cross section taken along a second imaginary plane (P2) which contains the bore axis (H).

The ridge is outwardly concave in a cross section taken along the mid-plane (M).

In a cross section of each side surface taken along a second imaginary plane (P2) which contains the bore axis (H), the minor abutment surfaces appear as straight lines.

Each major cutting edge extends across less than an entire length of a triangle side of the major surface, formed at a meeting between each side surface and a major surface.

Each major surface comprises a planar major abutment surface and three elongated major relief surfaces, each of which extends along a triangle side, between a corresponding major cutting edge and the major abutment surface.

The milling insert has a 120° rotational symmetry about the insert bore axis (H).

The minor abutment surfaces lie in a cylinder which has a first radius (R1).

The first radius (R1) has a range of between 50 and 110 millimeters.

In a plan view of each major surface a circle (C1) is inscribed between the major cutting edges and has a second radius (R2); and wherein the milling insert has a curvature ratio C=(R1/R2) which is larger than 7.

On each side surface, the minor abutment surface is the largest surface.

The milling insert is devoid of a ramping edge.

The corner cutting edge, the minor cutting edge and a minor t-land which extends therefrom, lie in a common plane

BRIEF DESCRIPTION OF THE DRAWINGS

For a better understanding of the subject matter of the present application and to show how the same may be carried out in practice, reference will now be made to the accompanying drawings, in which.

Figure 1:
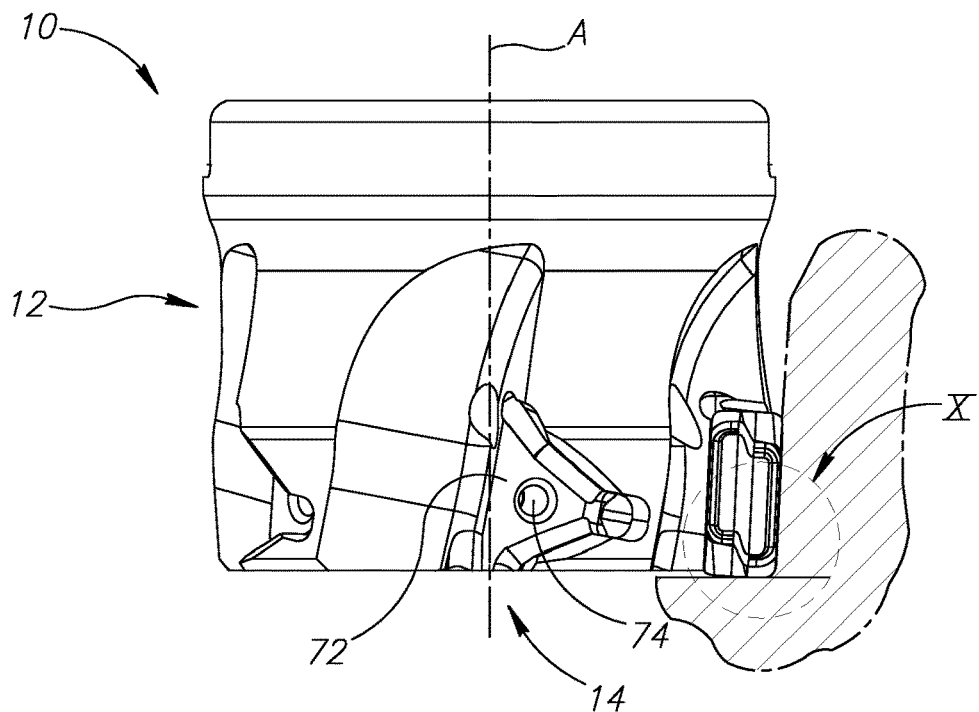
FIG. 1 is a side view of a milling tool in an operative position, showing a milling insert clamped in a pocket and engaging a workpiece.

Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
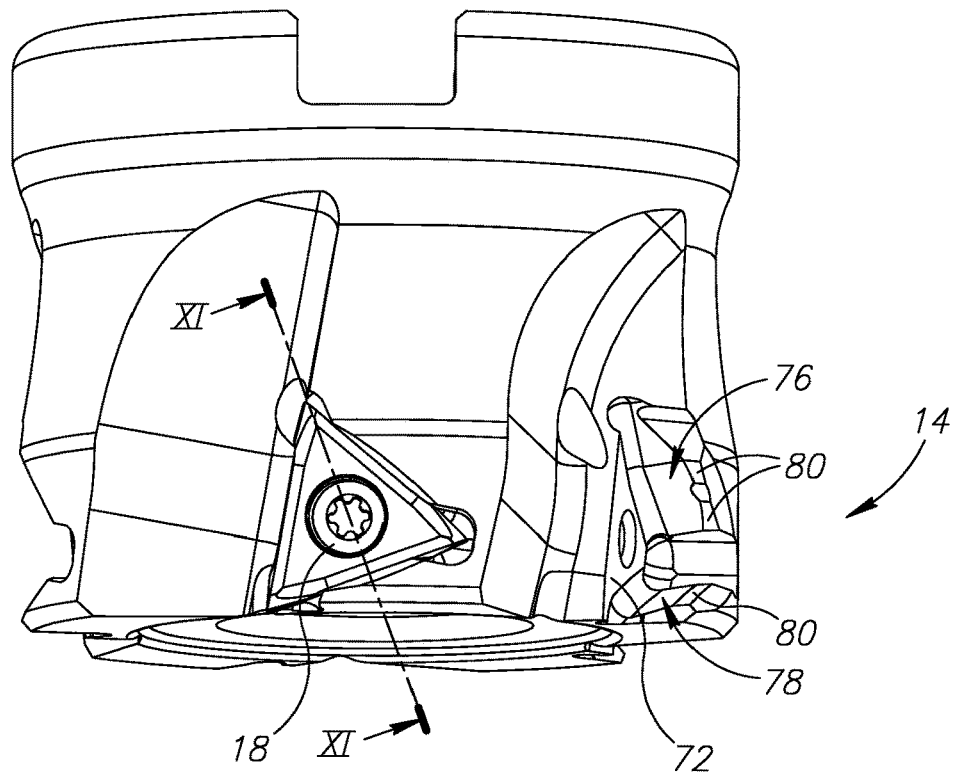
FIG. 2 is an isometric view of the milling tool of FIG. 1.

Reference is made to FIGS. 1 and 2. A milling tool 10 has a tool body 12 that rotates about a rotation axis A and includes tangentially oriented pockets 14. The milling tool 10 includes tangential milling inserts 16 which are retained, or clamped, in the pockets 14 via a clamping member 18. In the present example, the clamping member 18 is a screw.

The milling insert 16 is typically made of extremely hard and wear-resistant material such as cemented carbide, either by form-pressing or by injection molding and sintering carbide powders in a binder. The cemented carbide may be, for example, tungsten carbide. The milling insert 16 may be coated or uncoated.

Figure 3:
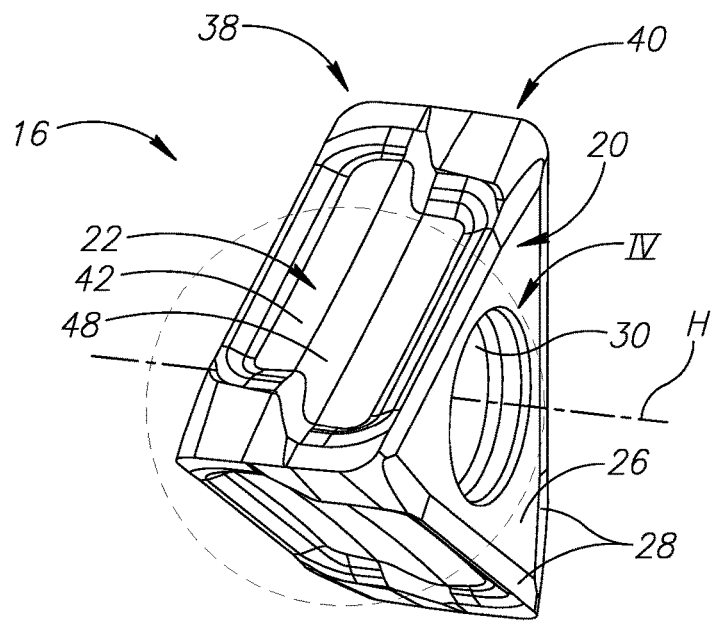
FIG. 3 is an isometric view of the milling insert of FIG. 1.
Figure 4:
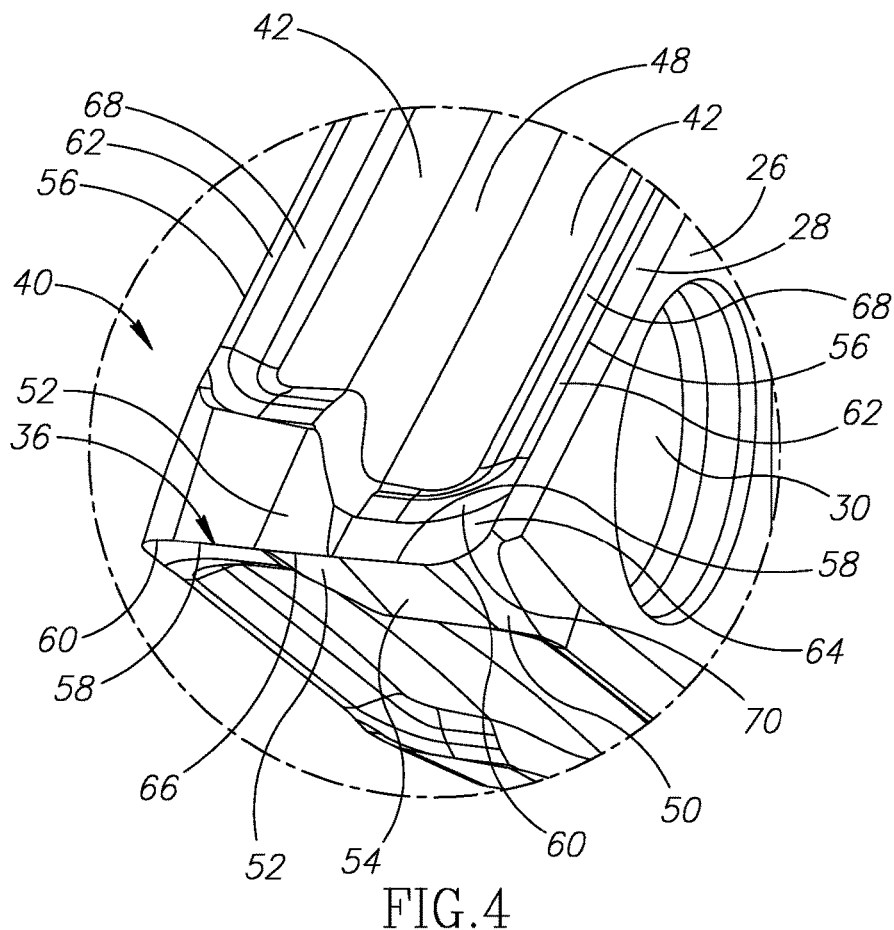
FIG. 4 is an enlarged view of the marked area IV of FIG. 3.
Figure 5:
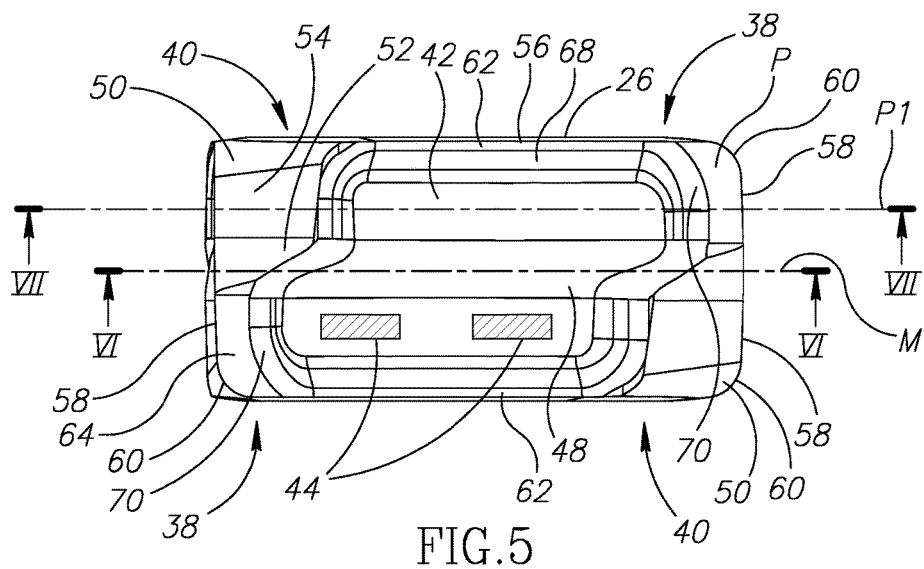
FIG. 5 is a plan view of a side surface of the milling insert.
Figure 6:
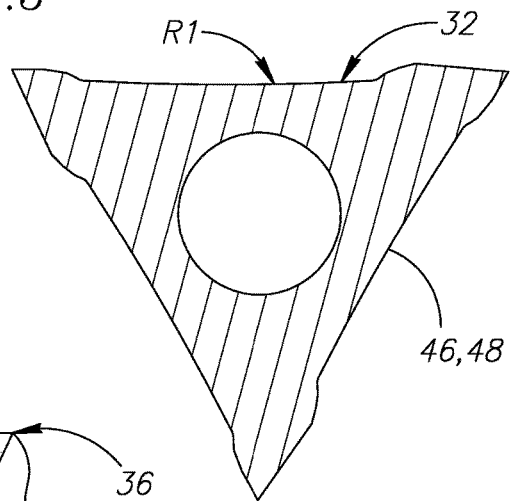
FIG. 6 is a cross section view of the milling insert taken along line VI of FIG. 5.
Figure 7:
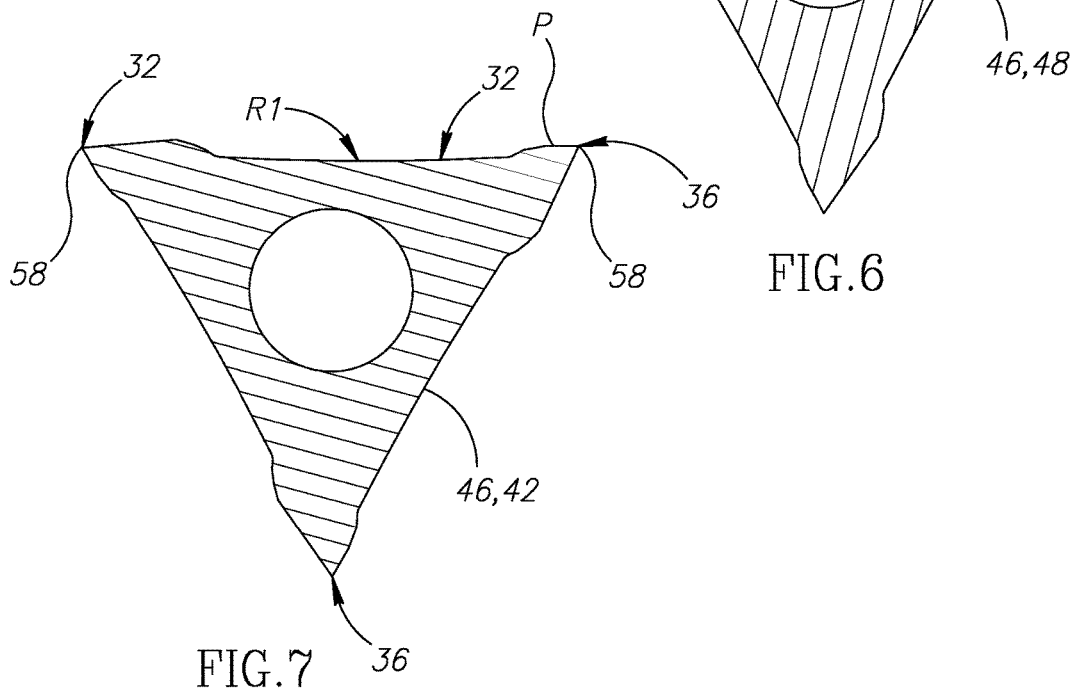
FIG. 7 is a cross sectional view of the milling insert taken along line VII of FIG. 5.
Figure 8:
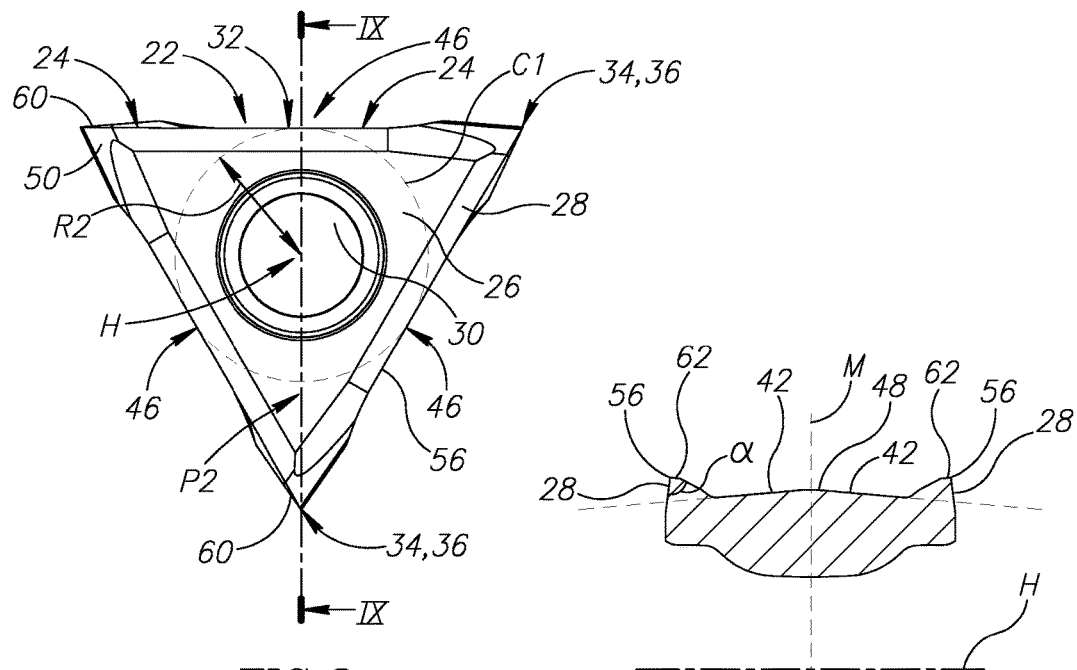
FIG. 8 is a plan view of a major surface of the milling insert.
Figure 9:
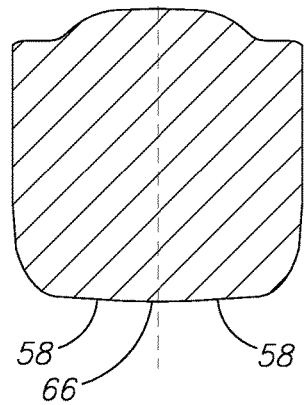
FIG. 9 is a cross sectional view taken along line IX of FIG. 8.
Figure 10:
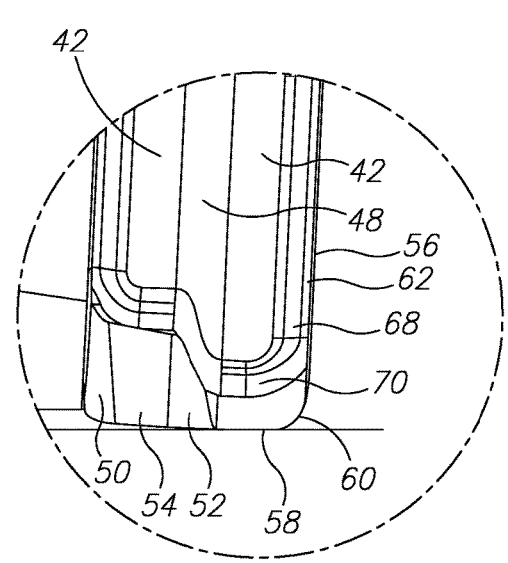
FIG. 10 is an enlarged view of marked area X of FIG. 1.
Figure 11:
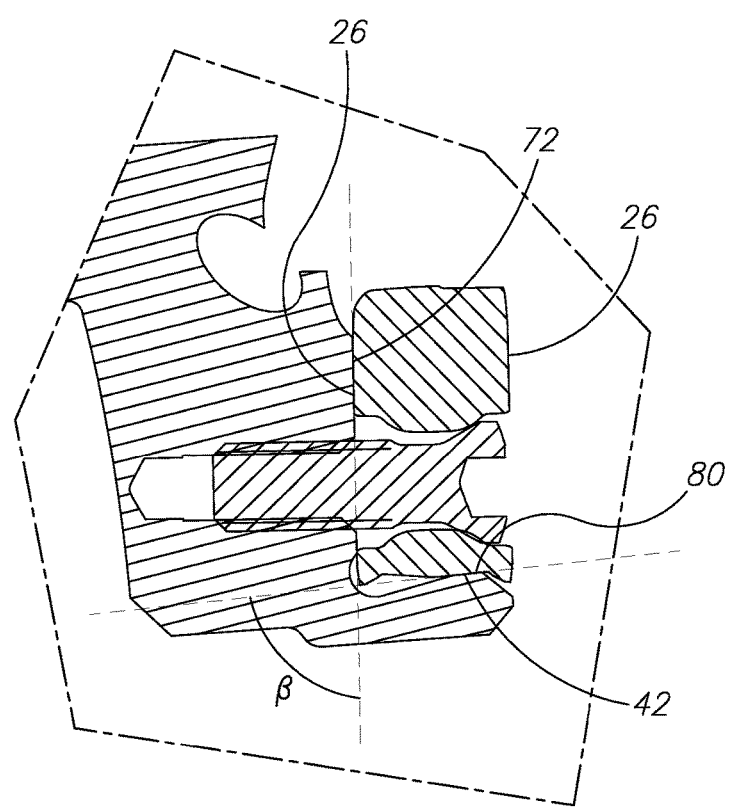
FIG. 11 is a cross sectional view taken along line XI of FIG. 2.

Attention is drawn to FIGS. 3, 8 and 9. The milling insert 16 is reversible and indexable. Each milling insert 16 includes two opposite major surfaces 20 which define a width direction therebetween. A peripheral surface 22 extends between the major surfaces 20.

The major surfaces 20 are identical and have a triangular shape. Each major surface 20 has a major edge 24, a centrally located major abutment surface 26 and three major relief surfaces 28. The major edge 24 may not be continuous, in the sense that in a plan view of a major surface 20, the major edge 24 appears as a contour thereof. Each of the major relief surfaces 28 extends between the major abutment surface 26 and the major edge 24. In other words, each major relief surface 28 extends between the major abutment surface 26 and a respective triangle side of the major surface 20. The major abutment surfaces 26 are parallel to each other and to a mid-plane M located midway therebetween.

The milling insert 16 includes a through insert clamping bore 30 which opens out directly, and solely, to the major abutment surfaces 26. The insert clamping bore 30 has a central insert bore axis H which is perpendicular to the mid-plane M. The milling insert 16 has a 120° rotational symmetry about the insert bore axis H.

In a projection along the insert bore axis H direction, at least 90% of the area of one major surface 20 overlaps the other major surface 20. Put differently, the milling insert 16 does not have a twisted design, as known in the field. Such a non-twisted geometry is relatively more robust and simpler/cheaper to produce compared to other tangential inserts with a twisted geometry (which usually have a more complex peripheral geometry), which can lead to an extended operative-lifespan of the insert. Furthermore, a non-twisted geometry allows more room for better chip flow, compared to inserts with a twisted geometry, which have crossing, or non-overlapping surfaces which can interfere with chip flow.

Attention is drawn to FIGS. 4-10. The peripheral surface 22 includes exactly three identical elongated side surfaces 32. Every two side surfaces 32 meet at a sharp corner 34 which includes a peripheral corner edge 36. The peripheral corner edge 36 is continuous, and extends between the two major edges 24. The peripheral corner edge 36 is devoid of a ramping edge.

Each side surface 32 has a parallelogram shape in a plan view thereof. Each side surface 32 includes two diagonally opposite cutting portions 38 and two diagonally-opposite relief portions 40. Each cutting portion 38 of one side surface 32 meets a relief portion 40 of an adjacent side surface 32 at the peripheral corner edge 36. Each side surface 32 further includes exactly two elongated, non-planar, minor abutment surfaces 42. On each side surface 32, the minor abutment surface 42 is the largest surface.

The two minor abutment surfaces 42 of every side surface 32 are located on opposite sides of the mid-plane M. Each minor abutment surface 42 continuously extends between a cutting portion 38 and a relief portion 40 located on the same side of the mid-plane M, on the same side surface. The cutting portion 38 and the relief portion 40 are raised outwards above the minor abutment surface 42. Stated differently, each minor abutment surface 42 is located inwards (i.e., recessed) in its entirety, below the respective cutting portion 38 and relief portion 40. Thus, as seen in the plan view of the insert's major surface 20 (FIG. 8), no portion of the minor abutment surface 42 is visible. And as seen in the FIG. 9 cross-section taken along the imaginary plane P2 drawn in FIG. 8, the major cutting edge 56 is raised with respect to the minor abutment surfaces 42.

The minor abutment surfaces 42 are concavely curved. According to the present embodiment, the minor abutment surfaces 42 lie on an imaginary cylindrical surface. According to the present embodiment, in a cross section (FIG. 9) of each side surface 32 taken along a second imaginary plane P2 which contains the bore axis (H), the minor abutment surfaces 42 appear as straight lines. The imaginary cylindrical surface has a first radius R1 which ranges between 50 and 110 millimeters, and preferably is between 60 and 100 millimeters. These ranges depend on the size of the insert, i.e., the lower range corresponds to smaller inserts. In each major surface 20, a circle C1 centered about the bore axis H and having a second radius R2, is inscribed within, and delimited by, the major edge 24, or the triangle sides of the major surface 20. Each minor abutment surface 42 has a curvature ratio $C = R1/R2$ which is defined between the first and second radii R1, R2. The curvature ratio C is larger than 7.

The advantage of having this range of curvature ratios lies in the relatively large first radius R1 of the minor abutment surface 42, which enables a combination of both improved/smooth chip forming and maximization of the minor abutment surface 42 area on the side surface 32. When the milling inset is clamped into a pocket 14, in order to avoid an over constrained abutment, there is sometimes a need to define two minor abutment sub-surfaces 44 on each minor abutment surface 42. A further advantage of said curvature is that simplifies directing the abutment forces away from a middle of the minor abutment surface 42. In other words, the curvature makes it simpler to distinguish and separate between two opposite minor abutment sub-surfaces 44 on each minor abutment surface 42.

An even further advantage of said curvature of the minor abutment surfaces 42 is that it can greatly reduce, or eliminate, distortion of surfaces during sintering. For example, distortion may develop in a middle-section 46 of each side surface 32, which is the thinnest portion of the insert, when viewed in a plan view of each major surface 20.

Furthermore, every two adjacent minor abutment surfaces 42 converge outwardly, in a direction away from the bore axis H. This orientation of adjacent minor abutment surfaces 42, (i.e., dovetail arrangement, as it is sometimes referred to in the field) is formed to achieve a more stable, rigid abutment when the milling insert 16 is retained in the pocket 14, and to reduce indirect machining forces on the clamping arrangement (e.g.—the clamping member 18). The new combination of a dovetail arrangement/orientation with concavely curved minor abutment surfaces 42 forms a more efficient, multi-purposed side surface 32.

The minor abutment surfaces 42 meet at a non-planar, continuous longitudinal ridge 48 which extends along the mid-plane M. The ridge 48 is outwardly convex in a cross section taken along a second imaginary plane P2 which contains the insert bore axis H (see FIG. 9). Furthermore, the ridge 48 is outwardly concave in a cross section taken along the mid-plane M, which is perpendicular to the bore axis H (see FIG. 6). The ridge 48 is raised above the minor abutment surfaces 42, away from the insert clamping bore 30. The relief portion 40 and the cutting portion 38 are raised above the ridge 48. This is advantageous, because the chips have more room to flow—past the ridge 48. Furthermore, towards a middle of the ridge 48, due to its concave curvature, chips have even more room to flow compared to areas distant therefrom.

Each relief portion 40 includes a corner relief surface 50, an intermediate relief surface 52 and a minor relief surface 54 which extends therebetween.

Each cutting portion 38 includes a major cutting edge 56, a minor cutting edge 58 and a convex corner cutting edge 60 which extends therebetween. Each cutting portion 38 further includes major and minor t-lands 62, 64, and major and minor rake surfaces 68, 70.

Each major cutting edge 56 is formed on a respective major edge 24, at an intersection between a major relief surface 28 and a major t-land 62. The major cutting edge 56 extends continuously only between a corner cutting edge 60 and an adjacent relief portion 40.

The minor cutting edge 58 is formed on the peripheral corner edge 36, at an intersection between the minor relief surface 54 and a minor t-land 64. Each minor cutting edge 58 extends across less than 50% of the corner edge 36.

Each peripheral corner edge 36 includes two minor cutting edges 58 and a convex transition edge 66 which extends therebetween. The transition edge 66 is formed at a meeting between adjacent intermediate relief surfaces 52. The transition edge 66 is raised above the minor cutting edges 58, i.e., spaced farther from the insert clamping bore than the minor cutting edges 58. The transition edge 66 is not a cutting edge, nor is it designed to function as one. In other words, the transition edge 66 is relieved from the workpiece during machining.

According to the present example, the major t-land 62 extends inwards from the major cutting edge 56 towards the insert clamping bore 30 and the mid-plane M, and forms an acute edge angle α with the major relief surface 28. A major rake surface 68 extends from the major t-land 62 further inwards towards the insert clamping bore 30 and the mid-plane M. The major rake surface 68 connects with the minor abutment surface 42 of the same cutting portion 38.

Each minor t-land 64 extends between a minor rake surface 70 and the minor cutting edge 58. The minor rake surface 70 extends inwardly towards an adjacent minor abutment surface 42, and connects with the major t-land 62 and the associated.

The corner cutting edge 60, the minor cutting edge 58 and the minor t-land 64 all lie in a common plane P. The major cutting edge 56 does not lie in the common plane as the corner and minor cutting edges 58, and is located under, or inwards, with respect to the common plane P.

Attention is drawn to FIGS. 1 and 2. Each pocket 14 has a base abutment surface 72 and a pocket clamping bore 74 which opens out thereto. In the present example the pocket clamping bore 74 includes a female thread. According to the present embodiment, the base abutment surface 72 is substantially parallel to the rotation axis A, giving the milling insert 16 its tangential orientation. The pocket 14 has upper and lower walls 76, 78 which extend transversely from the base abutment surface 72. Each of the upper or lower walls 76, 78 includes at least one wall abutment surface 80 which forms an acute abutment angle β with the base surface, and corresponds with the dovetail orientation of the minor abutment surfaces 42. The wall abutment surfaces 80 have an outwardly convexly curved shape which corresponds with the curved shape of the minor abutment surfaces 42. The curved shape of the wall abutment surfaces 80 can improve wedging of the milling insert 16 in the pocket. In other words, the milling insert 16 is more stable, and firmly clamped in the pocket when compared to straight abutment surfaces.

In a coupled position, the milling insert 16 is seated in the pocket 14. One major abutment surface 26 abuts the base abutment surface 72. A minor abutment surface 42 of one side surface 32 abuts the pocket abutment surface of the upper wall 76. A minor abutment surface 42 of an adjacent side surface 32 abuts the wall abutment surface 80 of the lower wall 78. The screw 18 passes through the insert clamping bore 30 and is screw threaded into the pocket clamping bore 74. The pocket clamping bore 74 and the insert clamping bore 30 are eccentric, such that turning the screw, forces the milling insert 16 in a direction between the upper and lower walls 76, 78. The abovementioned dovetail arrangement generates indirect forces (in a direction parallel the insert bore axis H) which clamp down the milling insert 16 onto the base abutment surface 72.

What is claimed is:

1. A reversible and indexable triangular tangential milling insert (16) comprising two opposite triangular major surfaces (20) and a peripheral surface (22) extending therebetween, the milling insert (16) further comprising a mid-plane (M) located midway between the major surfaces (20), and an insert clamping bore (30) opening out directly to the major surfaces (20) and having a central bore axis (H), the peripheral surface (22) comprising exactly three identical elongated side surfaces (32), each side surface (32) comprising exactly two cutting portions (38), two relief portions (40) and two identical elongated minor abutment surfaces (42) located on opposite sides of the mid-plane (M), each continuously extending between respective cutting portion (38) and relief portion (40), each cutting portion (38) comprising:
a major cutting edge (56) defined at a meeting of the side surface (32) with a major surface (20),
a minor cutting edge (58) defined at a meeting of the side surface (32) with an adjacent side surface (32), and
a corner cutting edge (60) extending between the major and minor cutting edges (56, 58), wherein,
in a cross section along a first imaginary plane (P1) which is perpendicular to the bore axis (H), each minor abutment surface (42) is concavely curved; and
in a cross-section along a second imaginary plane (P2) which is perpendicular to the first imaginary plane (P1) and contains the bore axis (H), on each side surface (32), the minor abutment surfaces (42) converge towards the mid-plane (M), outwardly, away from the insert clamping bore (30).

2. The milling insert (16) according to claim 1, wherein:
in each side surface (32), all cutting edges (56, 58, 60) are raised in their entirety above the minor abutment surfaces (42), and
in a plan view of the major surface (20), no portion of the minor abutment surfaces (42) are visible.

3. The milling insert (16) according to claim 1, wherein each relief portion (40) comprises an intermediate relief surface (52), a corner relief surface (50) and a minor relief surface (54) which extends therebetween.

4. The milling insert (16) according to claim 1, wherein every two adjacent minor abutment surfaces (42) meet at a non-planar continuous longitudinal ridge (48) which extends along the mid-plane (M).

5. The milling insert (16) according to claim 4, wherein in each side surface (32), all the cutting edges (56, 58, 60) are raised above the ridge (48), away from the insert clamping bore (30).

6. The milling insert (16) according to claim 4, wherein the ridge (48) is convex in a cross section taken along the second imaginary plane (P2).

7. The milling insert (16) according to claim 4, wherein the ridge (48) is concave in a cross section taken along the mid-plane (M).

8. The milling insert (16) according to claim 1, wherein in a cross section of each side surface (32) taken along the second imaginary plane (P2), the minor abutment surfaces (42) appear as straight lines.

9. The milling insert (16) according to claim 1, wherein each major cutting edge (56) extends for less than an entire length of a triangle side of the corresponding major surface (20).

10. The milling insert (16) according to claim 1, wherein each major surface (20) comprises:
a planar major abutment surface (26) and
three elongated major relief surfaces (28), each of which extends along a triangle side, between a corresponding major cutting edge (56) and the major abutment surface (26).

11. The milling insert (16) according to claim 1, wherein the milling insert (16) has a 120° rotational symmetry about the insert bore axis (H).

12. The milling insert (16) according to claim 1, wherein the minor abutment surfaces (42) lie on an imaginary cylindrical surface having a first radius (R1).

13. The milling insert (16) according to claim 12, wherein the first radius (R1) has a range of between 50 and 110 millimeters.

14. The milling insert (16) according to claim 12, wherein:
in a plan view of each major surface (20), a circle (C1) centered about the bore axis (H) and having a second radius (R2) is inscribed between and delimited by the major cutting edges (56); and
the milling insert (16) has a curvature ratio C=(R1/R2) which is larger than 7.

15. The milling insert (16) according to claim 1, wherein on each side surface (32), the minor abutment surface (42) is the largest surface.

16. The milling insert (16) according to claim 1, wherein the milling insert (16) is devoid of a ramping edge.

17. The milling insert (16) according to claim 1, wherein:
a minor t-land (64) extends from the corner cutting edge (60) and the minor cutting edge (58); and
the minor t-land (64), the corner cutting edge (60) and the minor cutting edge (58) lie in a common plane (P).

18. A reversible and indexable triangular tangential milling insert (16) comprising two opposite triangular major surfaces (20) and a peripheral surface (22) extending therebetween,
the milling insert (16) further comprising a mid-plane (M) located midway between the major surfaces (20), and an insert clamping bore (30) opening out directly to the major surfaces (20) and having a central bore axis (H),
the peripheral surface (22) comprising exactly three identical elongated side surfaces (32),
each side surface (32) comprising exactly two diagonally opposite cutting portions (38) and two elongated minor abutment surfaces (42) located on opposite sides of the mid-plane (M), wherein:
each minor abutment surface (42) lies on an imaginary cylindrical surface having a first radius (R1);
in a plan view of each major surface (20) a circle (C1) centered about the bore axis (H) and having a second radius (R2) is inscribed between and delimited by three major cutting edges defined between said each major surface (20) and a corresponding one of the three side surfaces (32); and
the milling insert (16) has a curvature ratio C=(R1/R2) which is larger than 7.

19. A milling tool (10) comprising:
a tool body (12) having a plurality of pockets (14); and
a milling insert (16) according to claim 18 retained in each of said plurality of pockets by a clamping member (18).

20. The milling tool (10) according to claim 19, wherein each pocket (14) comprises:
a base abutment surface (72);
a pocket clamping bore (74) which opens out to the base abutment surface (72); and
upper and lower walls (76, 78) which extend transversely to the base abutment surface (72).

21. The milling tool (10) according to claim 20, wherein each of the upper and lower walls (76, 78) includes at least one wall abutment surface (80) which is convexly curved.

22. The milling tool (10) according to claim 20, wherein in a clamped position:
one major abutment surface (26) abuts the base abutment surface (72); and
two minor abutment surfaces (42) belonging to different side surfaces (32) but located on the same side of the mid-plane (M), abut respective wall abutment surfaces (80).

23. A milling tool (10) comprising:
a tool body (12) having a plurality of pockets (14); and
a milling insert (16) according to claim 1 retained in each of said plurality of pockets by a clamping member (18).

* * * * *